US009625157B2

(12) United States Patent
Melton et al.

(10) Patent No.: US 9,625,157 B2
(45) Date of Patent: Apr. 18, 2017

(54) COMBUSTOR CAP ASSEMBLY

(71) Applicant: GENERAL ELECTRIC COMPANY, Schenectady, NY (US)

(72) Inventors: Patrick Benedict Melton, Horse Shoe, NC (US); James Harold Westmoreland, III, Greer, SC (US); Timothy Purcell, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 447 days.

(21) Appl. No.: 14/178,490

(22) Filed: Feb. 12, 2014

(65) Prior Publication Data

US 2015/0226435 A1    Aug. 13, 2015

(51) Int. Cl.
    *F23R 3/28*    (2006.01)
    *F23R 3/10*    (2006.01)

(52) U.S. Cl.
    CPC .............. *F23R 3/286* (2013.01); *F23R 3/10* (2013.01); *Y02T 50/675* (2013.01)

(58) Field of Classification Search
    CPC ........... F23R 3/286; F23R 3/10; Y02T 50/675
    See application file for complete search history.

(56) References Cited

U.S. PATENT DOCUMENTS

| 5,361,586 A | 11/1994 | McWhirter et al. |
| 5,901,555 A | 5/1999 | Mandai et al. |
| 6,038,861 A | 3/2000 | Amos et al. |
| 6,164,055 A | 12/2000 | Lovett et al. |
| 6,360,776 B1 | 3/2002 | McCormick et al. |
| 7,134,287 B2 | 11/2006 | Belsom et al. |
| 7,171,813 B2 | 2/2007 | Tanaka et al. |
| 8,065,880 B2 | 11/2011 | Ishizaka et al. |
| 8,122,721 B2 | 2/2012 | Johnson et al. |
| 8,205,452 B2 | 6/2012 | Boardman et al. |
| 8,327,642 B2 | 12/2012 | Uhm et al. |
| 2004/0163392 A1 | 8/2004 | Nishida et al. |
| 2011/0016866 A1 | 1/2011 | Boardman et al. |
| 2011/0113783 A1 | 5/2011 | Boardman et al. |
| 2012/0180488 A1 | 7/2012 | Bailey et al. |
| 2012/0227371 A1 | 9/2012 | Johnson et al. |

(Continued)

OTHER PUBLICATIONS

U.S. Appl. No. 14/186,016, filed Feb. 21, 2014, Boardman, Gregory Allen.

(Continued)

*Primary Examiner* — John C Hong
(74) *Attorney, Agent, or Firm* — Fletcher Yoder, P.C.

(57) ABSTRACT

A system includes a multi-tube fuel nozzle assembly. The multi-tube fuel nozzle assembly includes a support structure defining an interior volume configured to receive an air flow. The combustor cap assembly also includes multiple mixing tubes disposed within the interior volume. Each mixing tube of the multiple mixing tubes is configured to mix air and fuel to form an air-fuel mixture. The multi-tube fuel nozzle assembly further includes a combustor cap coupled to the support structure. The combustor cap includes multiple furcating nozzles integrated within the combustor cap. Each furcating nozzle of the multiple furcating nozzles is coupled to a respective mixing tube of the multiple mixing tubes. Also, each furcating nozzle of the multiple furcating nozzles is configured to receive a flow of the air-fuel mixture and to partition the flow of the air-fuel mixture into multiple air-fuel mixture flows.

20 Claims, 8 Drawing Sheets

(56) References Cited

U.S. PATENT DOCUMENTS

2013/0074503 A1 3/2013 Rohrssen et al.
2013/0125549 A1 5/2013 Bailey et al.
2013/0213051 A1 8/2013 Westmoreland et al.

OTHER PUBLICATIONS

U.S. Appl. No. 13/797,848, filed Mar. 12, 2013, Boardman et al.
U.S. Appl. No. 13/797,859, filed Mar. 12, 2013, Boardman et al.
U.S. Appl. No. 13/797,883, filed Mar. 12, 2013, Melton et al.
U.S. Appl. No. 13/797,896, filed Mar. 12, 2013, Westmoreland et al.
U.S. Appl. No. 13/797,912, filed Mar. 12, 2013, Chila et al.
U.S. Appl. No. 13/797,925, filed Mar. 12, 2013, Westmoreland et al.
U.S. Appl. No. 13/797,961, filed Mar. 12, 2013, Westmoreland et al.
U.S. Appl. No. 13/797,986, filed Mar. 12, 2013, Chila et al.
U.S. Appl. No. 13/797,012, filed Mar. 12, 2013, Melton et al.
U.S. Appl. No. 13/797,027, filed Mar. 12, 2013, Westmoreland et al.
U.S. Appl. No. 13/705,443, filed Dec. 5, 2012, Belsom et al.

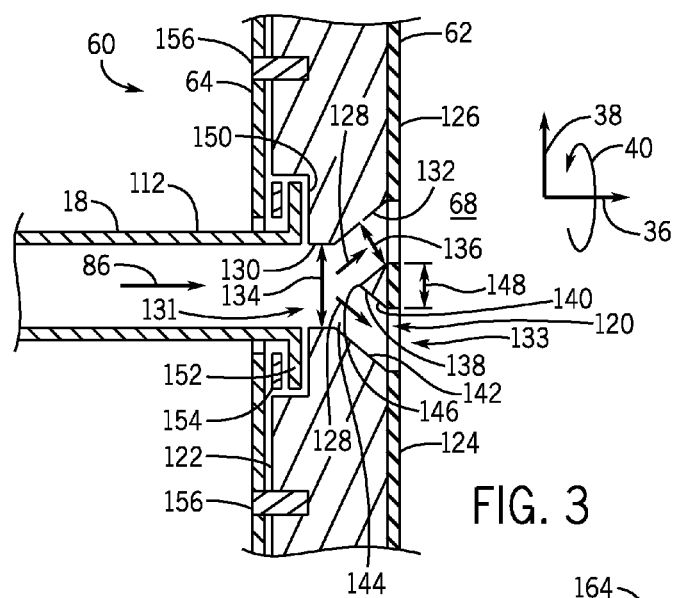
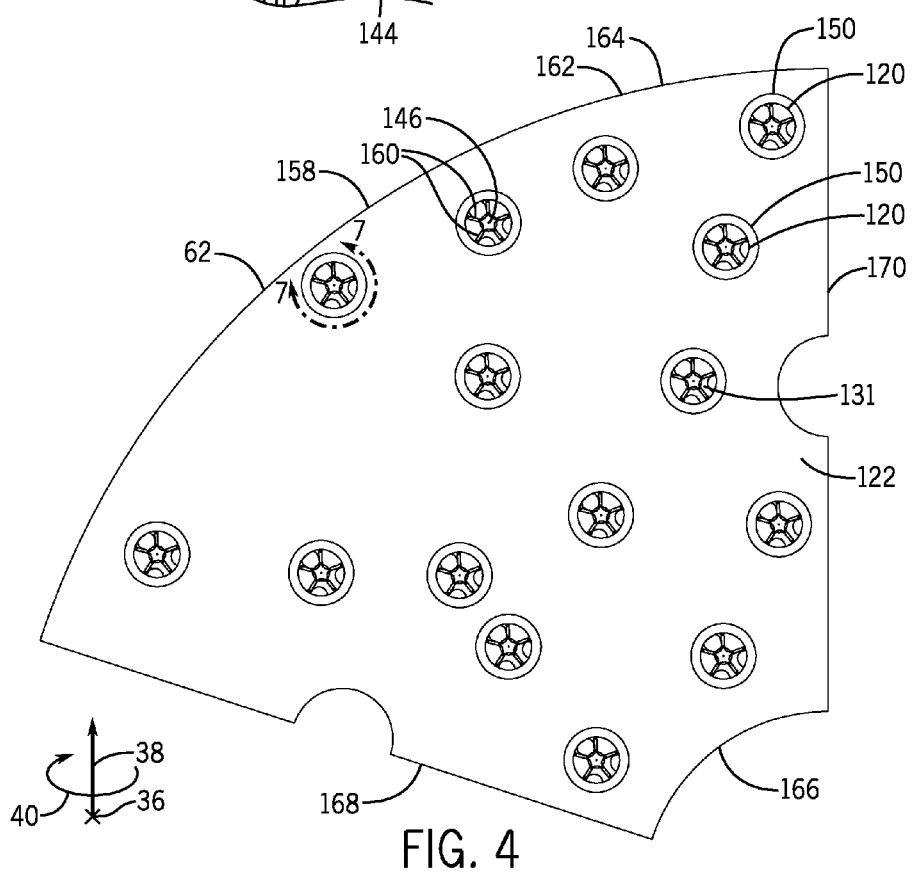

COMBUSTOR CAP ASSEMBLY

BACKGROUND

The subject matter disclosed herein relates generally to turbine combustors and, more particularly, to a cap for the turbine combustors.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes a fuel nozzle assembly, e.g., with multiple fuel nozzles, to inject fuel and air into a combustor. The design and construction of the fuel nozzle assembly can significantly affect the mixing and combustion of fuel and air, which in turn can impact exhaust emissions (e.g., nitrogen oxides, carbon monoxide, etc.) and power output of the gas turbine engine. Furthermore, the design and construction of the fuel nozzle assembly can significantly affect the time, cost, and complexity of installation, removal, maintenance, and general servicing.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a multi-tube fuel nozzle assembly. The multi-tube fuel nozzle assembly includes a support structure defining an interior volume configured to receive an air flow. The multi-tube fuel nozzle assembly also includes multiple mixing tubes disposed within the interior volume. Each mixing tube of the multiple mixing tubes is configured to mix air and fuel to form an air-fuel mixture. The multi-tube fuel nozzle assembly further includes a combustor cap coupled to the support structure. The combustor cap includes multiple furcating nozzles integrated within the combustor cap. Each furcating nozzle of the multiple furcating nozzles is coupled to a respective mixing tube of the multiple mixing tubes. Also, each furcating nozzle of the multiple furcating nozzles is configured to receive a flow of the air-fuel mixture and to partition the flow of the air-fuel mixture into multiple air-fuel mixture flows.

In accordance with a second embodiment, a system includes a multi-tube fuel nozzle assembly. The multi-tube fuel nozzle includes a support structure defining an interior volume configured to receive an air flow. The multi-tube fuel nozzle assembly also includes multiple mixing tubes disposed within the interior volume. Each mixing tube of the multiple mixing tubes is configured to mix air and fuel to form an air-fuel mixture. The multi-tube fuel nozzle assembly further includes a combustor cap coupled to the support structure. The combustor cap includes a first surface facing the multiple mixing tubes and a second surface disposed opposite the first surface. The combustor cap includes multiple furcating nozzles integrated within the combustor cap. Each furcating nozzle of the multiple furcating nozzles is coupled to a respective mixing tube of the multiple mixing tubes at the first surface. Each furcating nozzle of the multiple furcating nozzles includes a single first tube portion adjacent the first surface and multiple second tube portions adjacent the second surface. The single first tube portion has a first diameter. Each second tube portion of the multiple second tube portions has a second diameter that is smaller than the first diameter.

In accordance with a third embodiment, a system includes a combustor cap configured to be coupled to multiple mixing tubes of a multi-tube fuel nozzle. Each mixing tube of the multiple mixing tubes is configured to mix air and fuel to form an air-fuel mixture. The combustor cap includes multiple furcating nozzles integrated within the combustor cap. Each furcating nozzle of the multiple furcating nozzles is configured to couple to a respective mixing tube of the multiple mixing tubes. The combustor cap includes a first surface that is configured to face the multiple mixing tubes and a second surface disposed opposite the first surface. Each furcating nozzle of the multiple furcating nozzles includes a single first tube portion adjacent the first surface and multiple second tube portions adjacent the second surface. The single first tube portion has a first diameter. Each second tube portion of the multiple second tube portions has a second diameter that is smaller than the first diameter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional side view of an embodiment of a portion of the cap assembly of FIG. 2, taken within line 3-3, illustrating coupling between a mixing tube, retainer plate, and cap face;

FIG. 4 is a front view of an embodiment of a sector of a cap face of the cap assembly of FIGS. 2 and 3;

DETAILED DESCRIPTION

Figure 1:
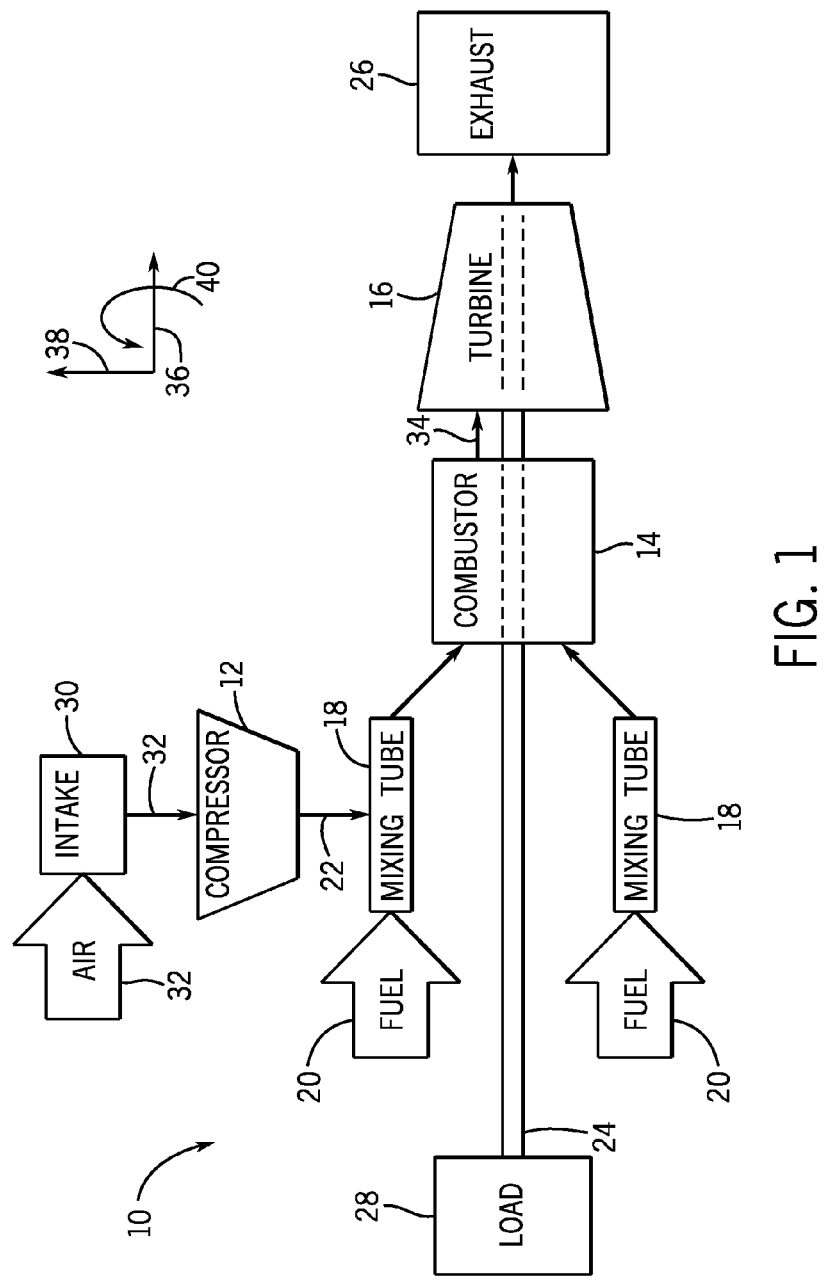
FIG. 1 is a block diagram of an embodiment of a gas turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a multi-tube fuel nozzle assembly that includes a combustor cap assembly for a multi-tube fuel nozzle, wherein the combustor cap assembly includes a combustor cap with a plurality of injection nozzles integrated within the combustor cap. For example, a combustor cap assembly for a multi-tube fuel nozzle includes a support structure that defines an interior volume for receiving an air flow. The multi-tube fuel nozzle assembly also includes multiple mixing tubes for mixing air and fuel disposed within the interior volume. The combustor cap assembly further includes a combustor cap that includes a plurality of injection nozzles (e.g., air-fuel mixture injection nozzles) integrated within the combustor cap. These injection nozzles may also be called dividing, partitioning, or furcating nozzles. Each injection nozzle is coupled to a respective mixing tube. Each injection nozzle receives a flow of an air-fuel mixture from a respective mixing tube and partitions the flow into a plurality of air-fuel mixture flows. In certain embodiments, each injection nozzle includes a single first tube portion (e.g., disposed adjacent a surface of the combustor cap facing the mixing tubes) located upstream of and coupled (e.g., fluidly and physically) to a plurality of second tube portions (e.g., disposed adjacent a surface opposite the surface of the combustor cap facing the mixing tubes). The second tube portions may include a diameter smaller than a diameter of the single first tube portion. In certain embodiments, each injection nozzle includes a central body (e.g., having a conical portion) and a plurality of structures disposed about the central body that radially extend between an outer surface of the central body and inner surface of the injection nozzle. The central body and the plurality of structures define a plurality of passages for the plurality of air-fuel mixture flows. The injection nozzles may pull out heat (e.g., transfer heat away) from the combustor cap on the surface (e.g., hot face) facing a combustion region via convective heat transfer. This may avoid effusion cooling of the combustor cap and any need for extra air. Although, in certain embodiments, the presently described system may be used in combination with additional secondary cooling. The presently described system may provide lower manufacturing costs, easier repair procedures, longer equipment lifetime, and/or lower emissions, for example.

Turning to the drawings, FIG. 1 illustrates a block diagram of an embodiment of a gas turbine system 10 (e.g., gas turbine engine). As described in detail below, the disclosed turbine system 10 may employ a cap assembly that includes a cap face or combustor cap that includes multiple injection nozzles that enable cooling the cap face on the hot side through convective heat transfer. As shown, the system 10 also includes a compressor 12 (e.g., with one or more compression stages), one or more turbine combustors 14, and a turbine 16 (e.g., with one or more turbine stages). The turbine combustor 14 may include one or more mixing tubes 18, e.g., in one or more multi-tube fuel nozzles, configured to receive both fuel 20 and pressurized oxidant 22, such as air, oxygen, oxygen-enriched air, oxygen reduced air, or any combination thereof. Although the following discussion refers to the oxidant as the air 22, any suitable oxidant may be used with the disclosed embodiments. The mixing tubes 18 may be described as micromixing tubes, which may have diameters between approximately 0.5 to 2, 0.75 to 1.75, or 1 to 1.5 centimeters. The mixing tubes 18 may be arranged in one or more bundles of closely spaced tubes, generally in a parallel arrangement relative to one another. In this configuration, each mixing tube 18 is configured to mix (e.g., micromix) on a relatively small scale within each mixing tube 18, which then outputs a fuel-air mixture into the combustion chamber. In certain embodiments, the system 10 may include between 10 and 1000 mixing tubes 18 (e.g., for each multi-tube fuel nozzle), and the system 10 may use a liquid fuel and/or gas fuel 20, such as natural gas or syngas. Furthermore, the combustor 14 may contain a cap assembly described in more detail in FIG. 2 that includes a removable cap face, a support structure, and/or mixing tubes 18. In certain embodiments, the cap face or combustor cap may be coupled to one or more multi-tube fuel nozzles. The cap face may include multiple injection nozzles that partition a flow of an air-fuel mixture from each mixing tube 18 into a plurality of air-fuel mixture flows that enable convective cooling of the combustor cap. The features of the cap face may lower manufacturing costs, extend equipment lifetime, and/or lower emissions.

Compressor blades are included as components of the compressor 12. The blades within the compressor 12 are coupled to a shaft 24, and will rotate as the shaft 24 is driven to rotate by the turbine 16, as described below. The rotation of the blades within the compressor 12 compresses air 32 from an air intake 30 into pressurized air 22. The pressurized air 22 is then fed into the mixing tubes 18 (e.g., in each of 1, 2, 3, 4, 5, 6, or more multi-tube fuel nozzles) of the turbine combustors 14. The pressurized air 22 and fuel 20 are mixed within the mixing tubes 18 to produce a suitable fuel-air mixture ratio for combustion (e.g., a combustion that causes the fuel to more completely burn) so as not to waste fuel 20 or cause excess emissions.

The turbine combustors 14 ignite and combust the fuel-air mixture, and then pass hot pressurized combustion gasses 34 (e.g., exhaust) into the turbine 16. Turbine blades are coupled to the shaft 24, which is also coupled to several other components throughout the turbine system 10. As the combustion gases 34 flow against and between the turbine blades in the turbine 16, the turbine 16 is driven into rotation, which causes the shaft 24 to rotate. Eventually, the combustion gases 34 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth. In the following discussion, reference may be made to an axial axis or direction 36, a radial axis or direction 38, and/or a circumferential axis or direction 40 of the turbine system 10.

Figure 2:
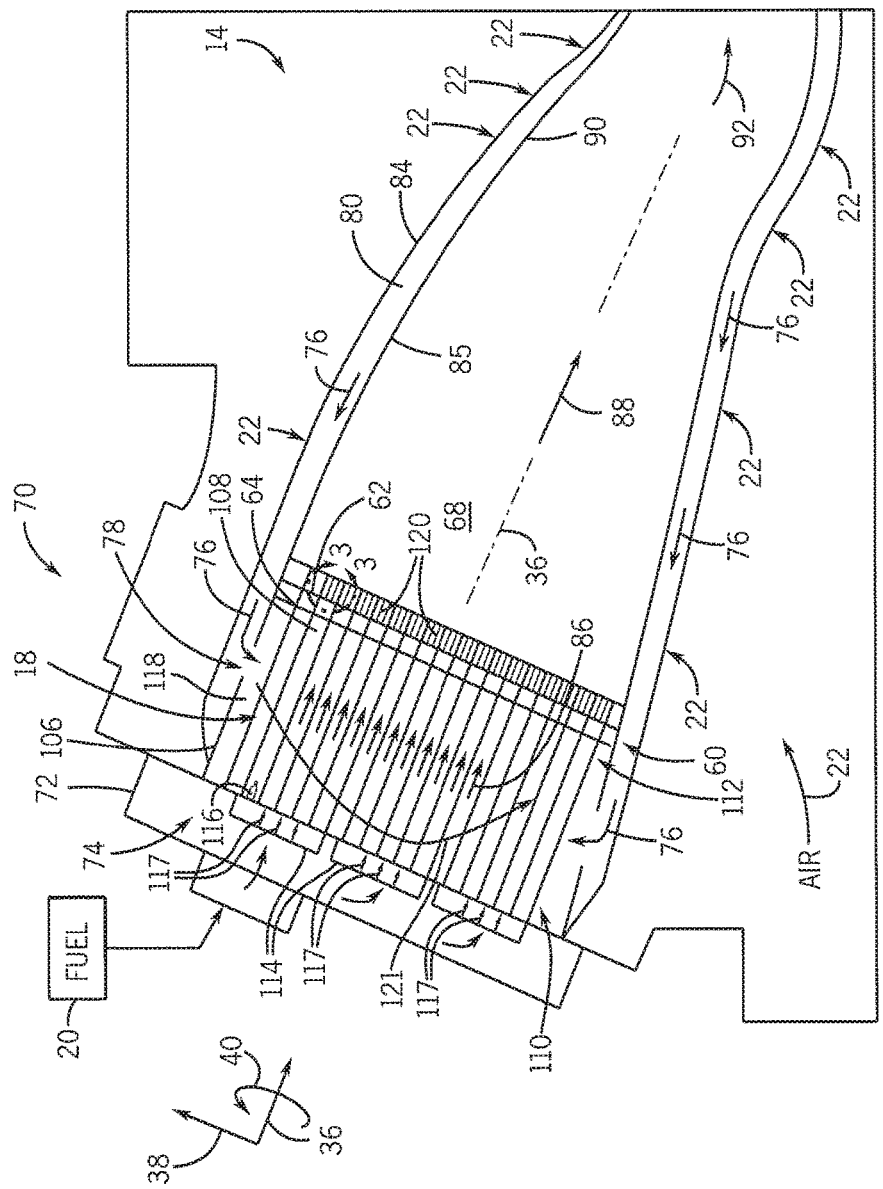
FIG. 2 is a cross-sectional side view of an embodiment of a portion of a turbine combustor of FIG. 1 coupled to a cap assembly of the turbine combustor.

FIG. 2 is a cross-sectional schematic of an embodiment of the combustor 14 of FIG. 1 having a cap assembly 60. The cap assembly 60 includes a combustor cap or cap face 62 (e.g., cap plate) and a retainer plate 64. In certain embodiments, the combustor cap 62 may be removable. In some embodiments, the cap assembly 60 may not include a retainer plate 64. As shown, the combustor 14 further includes a combustion chamber 68 and a head end 70. A plurality of the mixing tubes 18 (e.g., 10 to 100 or more mixing tubes in 1, 2, 3, 4, 5, 6, or more multi-tube fuel nozzles) are positioned within the head end 70 of the combustor 14. The mixing tubes 18 may generally extend between the cap face 62 and an end cover 72 and may extend in the axial direction 36. In some embodiments, the mixing tubes 18 are suspended in the head end 70, such that the mixing tubes 18 may not be attached to the end cover 72 or the cap face 62. Alternatively, however, the mixing tubes 18 may be coupled to at least one of the cap face 62 and/or the end cover 72, as further described below. As shown, each mixing tube 18 has a passage or chamber 108 extending between a first end 110 (e.g., axial end opening) and a second end 112 (e.g., axial end opening) of the mixing tube 18.

In some embodiments, the end cover 72 may be positioned upstream of, and proximate to, the first end 110 of the mixing tube 18. The end cover 72 may include one or more fuel inlets 114 through which the fuel 20 is provided to the mixing tubes 18. As illustrated, in certain embodiments, each mixing tube 18 includes a respective fuel injector 116, which receives the fuel 20 in the axial direction 36 as indicated by arrows 117. For simplicity, FIG. 2 only illustrates the fuel injector 116 for a single tube 18. In some embodiments, the fuel injector 116 may be generally coaxially positioned within each mixing tube 18 by inserting the fuel injector 116 axially 36 through the first end 110 of each mixing tube 18. Thus, the mixing tubes 18 may have a size, shape, and configuration to enable each mixing tube 18 to receive the corresponding fuel injector 116. In some embodiments, the end cover 72 may include a single common fuel plenum 74 (e.g., fuel supply chamber) for all of the mixing tubes 18 and associated fuel injectors 116. In other embodiments, the system 10 may include one, two, three, or more fuel plenums 74 (as shown in FIG. 2) that each provides fuel 20 to a subgroup of fuel injectors 116, and ultimately to the mixing tube 18 associated with each fuel injector 116. For example, one fuel plenum 74 may provide fuel to about 5, 10, 50, 100, 500, 1000, or more fuel injectors 116. In some embodiments, the combustor 14 having subgroups of fuel injectors 116 supplied by different fuel plenums 74 may allow one or more subgroups of fuel injectors 116 and corresponding mixing tubes 18 to be run richer or leaner than others, which in turn may allow for more control of the combustion process, for example. Additionally, multiple fuel plenums 74 may enable the use of multiple types of fuel 20 (e.g., at the same time) with the combustor 14.

A support structure 106 (e.g., side wall), which may be a barrel shaped structure, extends circumferentially 40 about the mixing tubes 18, the retainer plate 64, and other components of the combustor 14. Fuel 20 is provided through the end cover 72 to the mixing tubes 18. The fuel 20 is routed through the mixing tubes 18 in the axial direction 36. The cap face 62 may be coupled to the head end 70 of the combustor 14 (e.g., with a radial spring or with fasteners such as bolts) so that it may be detached from the support structure 106. Furthermore, the retainer plate 64 may be coupled to the support structure 106, upstream of the cap face 62. Like the cap face 62, in certain embodiments, the retainer plate 64 may be removably coupled (e.g., bolted, threaded, etc.) to the support structure 106 such that it may be removed to allow for inspection, maintenance, and/or removal of the mixing tubes 18 and other components of the head end 70. The retainer plate 64 may provide additional support for the second end 112 of the mixing tubes 18. As mentioned above, one or more components of the cap assembly 60 may be removed from the support structure 106 in order to enable inspection, maintenance, and/or removal of the components of the cap assembly 60 as well as various components of the combustor 14, including the mixing tubes 18.

As described above, the compressor 12 receives air 32 from the air intake 30, compresses the air 32, and produces the flow of pressurized air 22 for use in the combustion process. As shown by arrow 76, the pressurized air 22 is provided to the head end 70 of the combustor 14 through an air inlet 78 (e.g., one or a plurality of air inlets), which directs the air laterally or radially 38 inward towards side walls of the mixing tubes 18. More specifically, the pressurized air 22 flows in the direction indicated by arrow 76 from the compressor 12 through an annulus 80 between a liner 85 and a flow sleeve 84 of the combustor 14 to reach the head end 70. The liner 85 is positioned circumferentially about combustion chamber 68, the annulus 80 is positioned circumferentially about liner 85, and the flow sleeve 84 is positioned circumferentially about the annulus 80. Upon reaching the head end 70, the air 22 turns from the axial direction 36 to the radial direction 38 through the inlet 78 toward the mixing tubes 18, as indicated by arrows 76. More specifically, pressurized air 22 may flow through the air inlet 78 laterally into an air cavity 118 within the head end 70 (e.g., in a generally radial direction 38 as indicated by arrow 122). The air cavity 118 includes the volume of space in between the plurality of mixing tubes 18 and surrounded by the support structure 106 (e.g., outer wall). The pressurized air 22 spreads throughout the air cavity 118 as the pressurized air 22 flows to each of the plurality of mixing tubes 18.

The pressurized air 22 enters each of the mixing tubes 18 and is mixed with the fuel 20 within the plurality of mixing tubes 18. Each mixing tube 18 receives the fuel 20 in the axial direction 36 through an axial end portion of the mixing tube 18, while also receiving the air 22 through a plurality of openings in the mixing tube 18 or through the axial end portion of the mixing tube 18. Thus, the fuel 20 and the air 22 mix within each individual mixing tube 18. As shown by arrows 86, the fuel-air mixture flows downstream within the mixing tubes 18, through the cap face 62, and into the combustion chamber 68, where the fuel-air mixture is ignited and combusted to form the combustion gases 34 (e.g., exhaust). As described in greater detail below, the cap face 62 includes injection nozzles 120 that divide the flow of air-fuel mixture from each mixing tube 18 into a plurality of air-fuel mixture flows. For example, each injection nozzle may include a single tube portion adjacent a cold face (e.g., facing the mixing tubes 18) of the cap face 62 that downstream partitions into a plurality of smaller tubes portions adjacent the hot face of the cap face 62 (e.g., facing the combustion chamber 68). The combustion gases 34 flow in a direction 88 toward a transition piece 90 of the turbine combustor 14. The combustion gases 34 pass through the transition piece 90, as indicated by arrow 92, toward the turbine 16, where the combustion gases 34 drive the rotation of the blades within the turbine 16.

In certain embodiments, the cap assembly 60, including the cap face 62 and/or the retainer plate 64, may be configured to be removed to enable inspection, maintenance, and/or removal of components of the combustor 14, including the mixing tubes 18. In addition, the injection nozzles within the cap face 62 enable convective cooling of the cap face 62, which may reduce emissions (e.g., $NO_x$ emissions) of the turbine system 10. The cap assembly 60 may therefore extend the life cycle of the combustor 14 and reduce its lifetime costs.

FIG. 3 illustrates a cross-sectional side view of an embodiment of a portion of the cap assembly 60 of FIG. 2, taken within line 3-3, illustrating coupling between the mixing tube 18, retainer plate 64, and cap face 62. As depicted, the cap face 62 includes the injection nozzle 120 integrated within and extending through the cap face 62 from a first surface 122 (e.g., cold surface or side facing the mixing tube 18) to a second surface 124 (e.g., hot surface or side facing the combustion chamber 68). The cap face 62 may include a respective injection nozzle 120 associated or coupled to each mixing tube 18. In certain embodiments, the cap face 62 may include between 10 and 1000 injection nozzles 120. In some embodiments, the cap face 62 may be hollow between the injection nozzles 120 corresponding to mixing tubes 18. In addition, the cap face 62 may be composed of a plurality of sectors (e.g., wedge shaped sectors) that each includes a subset of the total injection nozzles 120 (see FIGS. 4 and 6). The number of sectors may range between 2 and 10. Alternatively, the cap face 62 may be composed of a single piece (see FIG. 5). In certain embodiments, a thermal barrier coating 126 (e.g., bonded ceramic) may be disposed on the second surface 124 of the cap face 62.

The injection nozzle 120 is configured to receive the flow of the air-fuel mixture, represented by arrow 86, from the mixing tube 18 and to partition the flow 86 into a plurality of air-fuel mixture flows, represented by arrows 128. The injection nozzle 120 includes a single first tube portion 130 located upstream (e.g., axially upstream) of and coupled (e.g., fluidly and physically) to a plurality of second tube portions 132. In certain embodiments, the number of second tube portions 132 may range from 2 to 15, such as 2, 3, 4, 5, 6, 7, 8, 9, or 10 second tube portions 132. The single first tube portion 130 is located adjacent the first surface 122 of the cap face 62, while the second tube portions 132 are located adjacent the second surface 124 of the cap face 62. The single tube portion 130 includes an inlet 131 to receive the flow 86 of the air-fuel mixture from the mixing tube 18 and the second tube portions 132 each include an outlet 133 to discharge a respective air-fuel mixture flow 128 into the combustor chamber 68. The single first tube portion 130 includes a diameter 134. The diameter 134 of the tube portion 130 may range between approximately 0.5 to 2, 0.75 to 1.75, or 1 to 1.5 centimeters. Each second tube portion 132 includes a diameter 136. The diameter 136 of each second tube portion 132 is smaller than the diameter 134 of the first tube portion 130. For example, the diameter 136 may be approximately 1 to 90, 2 to 80, 3 to 70, 4 to 60, 5 to 50, or 10 to 25 percent of the diameter 134. The second tube portions 132 extend both axially 36 and radially 38 away from the first tube portion 130. In other words, the second tube portions 132 diverge from the first portion 130 (see FIG. 9). For example, a portion of the second portions 132 may diverge from a longitudinal axis of the first tube portion 130 by an angle of approximately 1 to 75, 2 to 60, 3 to 50, 4 to 40, or 5 to 30 degrees, or approximately 10, 15, 20, 25, 30, 35, 40, or 45 degrees (+/−5 degrees). Also, the injection nozzle 120 includes a central body 138 disposed between the second tube portions 132. In certain embodiments, a plurality of structures is disposed about the central body 138 that separate the second tubes portions 132 from each other (see FIGS. 7 and 8). The structures may radially 38 extend between an outer surface 140 of the central body 138 and an inner surface 142 of the injection nozzle 120. Together, the central body 138 and the structures define the second tube portions 132 and a plurality of passages 144 for the respective plurality of air-fuel mixture flows 128. The central body 138 includes a conical portion 146 that increases in cross-sectional area 148 (e.g., diverges) in a direction (e.g., axial direction 36) from the first surface 122 to the second surface 124. By partitioning the air-fuel mixture flow, the injection nozzles enable heat to be pulled out (e.g., transferred away) from the cap face 62 on the second surface 124 via convective heat transfer. Specifically, the plurality of second tube portions 132 increases the surface area that interacts with the air-fuel mixture flow for convective heat transfer. This may avoid effusion cooling of the cap face 62 and any need for extra air for the cooling of the cap face 62. Although, in certain embodiments, the disclosed embodiments may be used in combination with effusion cooling.

In certain embodiments, the injection nozzle 120 also includes a shoulder 150 located on the first surface 122 of the cap face 62 upstream (e.g., axially upstream) of the first tube portion 130. As depicted, the shoulder 150 enables an end portion 152 of the second end 112 of the mixing tube 18 to be disposed within the shoulder 150. In certain embodiments, the shoulder 150 includes an annular shape. A spring 154 (e.g., annular spring such as a wave spring) is circumferentially disposed about the second end 112 of the mixing tube 18 upstream (e.g., axially upstream) of the end portion 152. The spring 154 is disposed between the end portion 152 of the mixing tube 18 and the retainer plate 64. Upon securing the retainer plate 64 to the cap face 62 via fasteners 156 (e.g., bolts), the spring 154 exerts a force (e.g., axially 36) to secure the tube 18 in place within the shoulder 150 of the injection nozzle 120. Each mixing tube 18 may be secured via one or more respective springs 154 within a respective shoulder 150 of the cap face 62. As described above, the retainer plate 62 also at least partially supports the mixing tubes 18. In certain embodiments, the injection nozzle 120 may not include the shoulder 150. Instead, other means may be utilized to secure the mixing tubes 18 to the respective injection nozzle 120. In addition, in certain embodiments, the combustor cap assembly 60 may not include the retainer plate 62.

Figure 5:
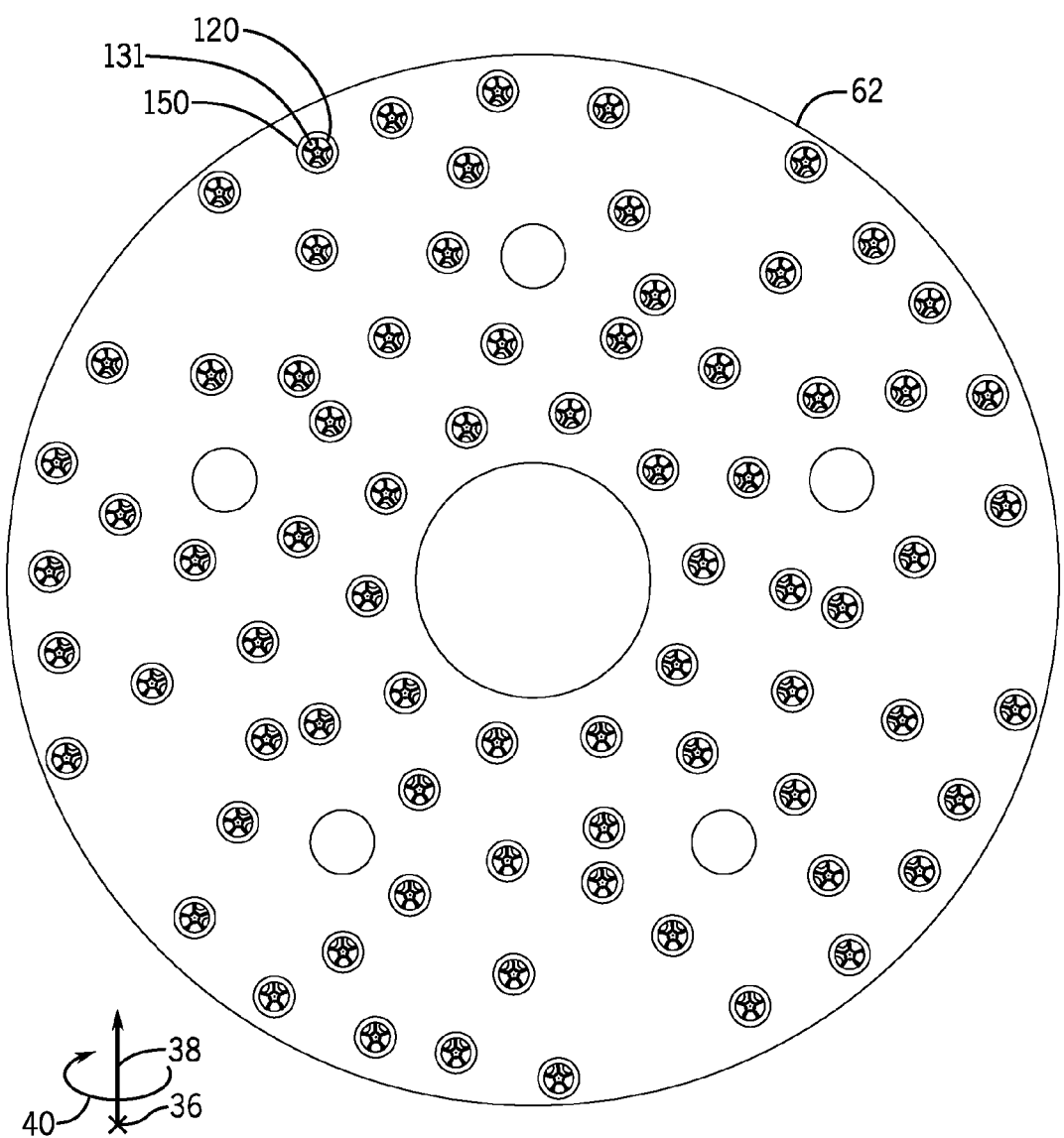
FIG. 5 is a front view of an embodiment of a cap face of the cap assembly of FIGS. 2 and 3 (e.g., single piece)

FIG. 4 is a front view (e.g., first surface 122 or cool side) of an embodiment of a sector 158 of the cap face 62 of the cap assembly 60 of FIGS. 2 and 3. The sector 158 includes a plurality of injection nozzles 120 configured to be associated or coupled to respective mixing tubes 18. In certain embodiments, the sector 158 may include between 2 and 200 injection nozzles 120. The injection nozzles 120 are as described above. For example, each injection nozzle 120 includes the shoulder 150 (e.g., annular shoulder) to receive a respective mixing tube 18. In certain embodiments, the injection nozzle 120 may not include a shoulder 150. Also, each injection nozzle 120 includes a conical portion 146 and a plurality of structures 160 that define the second tube portions 132 as described in greater detail below. As mentioned above, the cap face 62 may be composed of a plurality of sectors 158 that each includes a subset of the total injection nozzles 120. The number of sectors 158 may range between 2 and 10, such as 2, 3, 4, 5, 6, 7, 8, 9, or 10 sectors 158. As depicted, the sector 158 includes a non-circular perimeter 162 (e.g., truncated pie shape). In certain embodiments, the perimeter 162 may include other shapes (e.g., square, hexagon, triangle, or other polygon). The perimeter 162 includes two parallel sides 164, 166 and two converging sides 168, 170. The sides 164, 166 are arcuate shaped, while sides 168, 170 are generally linear (e.g., diverging in radial direction 38). In certain embodiments, as illustrated in FIG. 5, the cap face 62 may be formed of a single piece, instead of a plurality of sectors 158. The cap face 62 is as described above with the exception that the cap face 62 is a single piece having a circular perimeter that covers the same area as multiple sectors 158 put together as described above.

Figure 6:
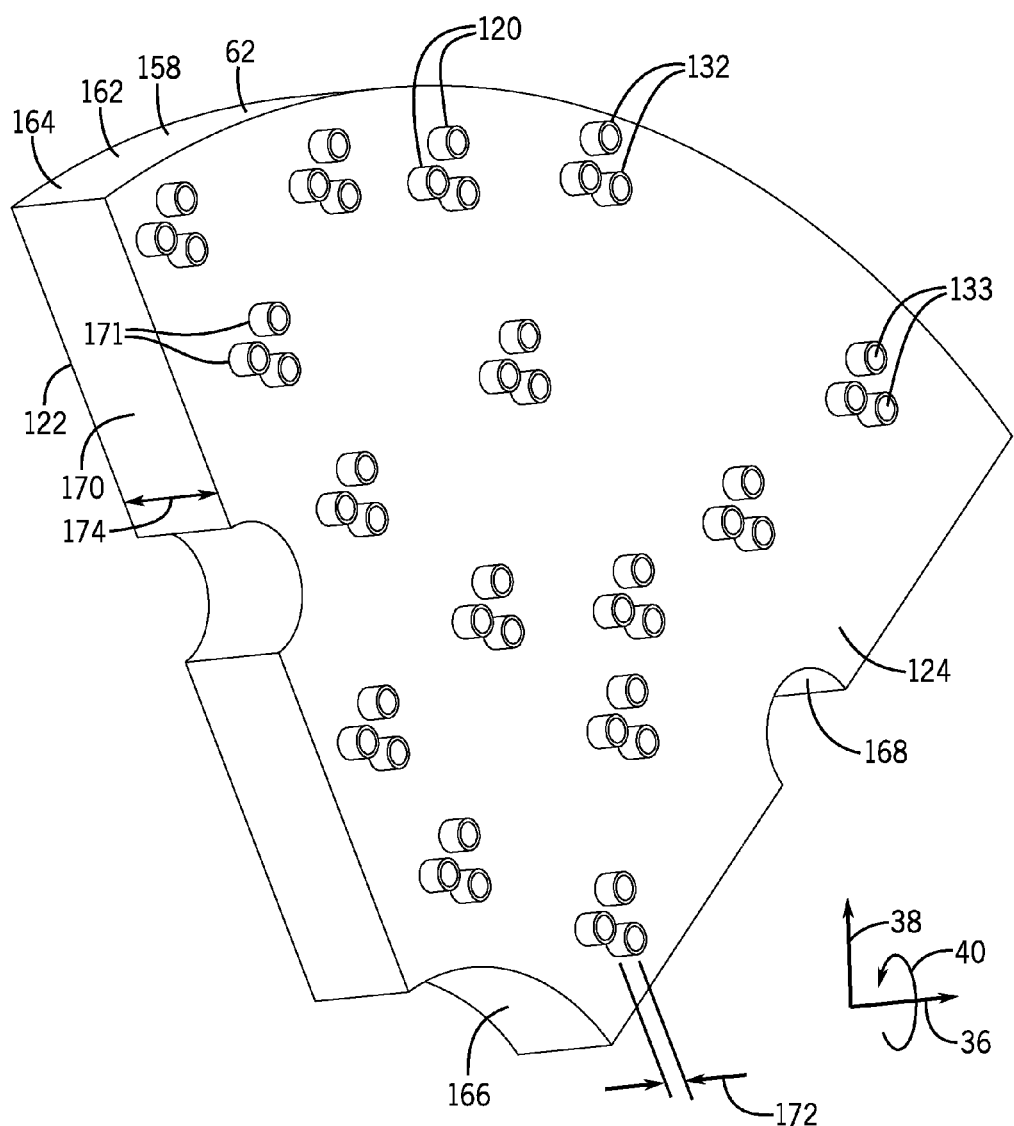
FIG. 6 is a perspective back view of an embodiment of the sector of the cap face of the cap assembly of FIG. 4.

FIG. 6 is a perspective back view (e.g., second surface 124 or hot face) of an embodiment of the sector 158 of the cap face 62 of FIG. 4. The cap face 62 is as described above. In addition, as depicted, in certain embodiments, a portion 171 of each of the second tube portions 132 of the injections nozzles 120 may extend beyond (e.g., protrude from) the second surface 124 of the cap face 62 in the axial direction 36 by a length 172. The length 172 of the portion 171 (e.g., protruding portion) of the second tube portion 132 extending beyond the second surface 124 may range from approximately 0.05 to 0.50 a length 174 between the first surface 122 and the second surface of the cap face 62. In certain embodiments, the second tube portions 132 of the injection axes 120 may not extend beyond the second surface 124 of the cap face 62. The number of second tube portions 132 extending from the second surface 124 may range from 4 to 3000.

Figure 7:
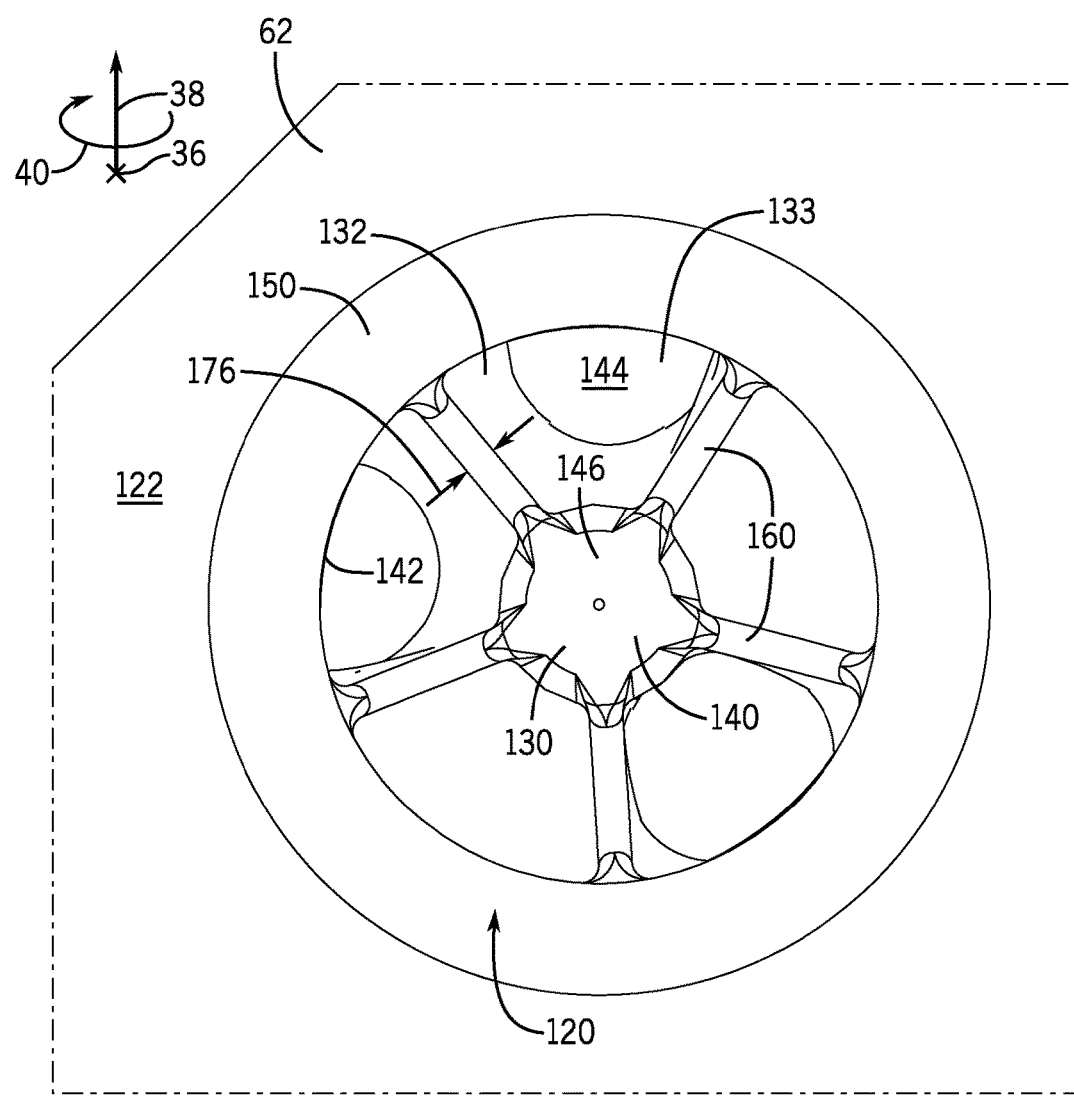
FIG. 7 is a front view of an embodiment of an injection nozzle of the sector of the cap face of the cap assembly of FIG. 4, taken within line 7-7.
Figure 8:
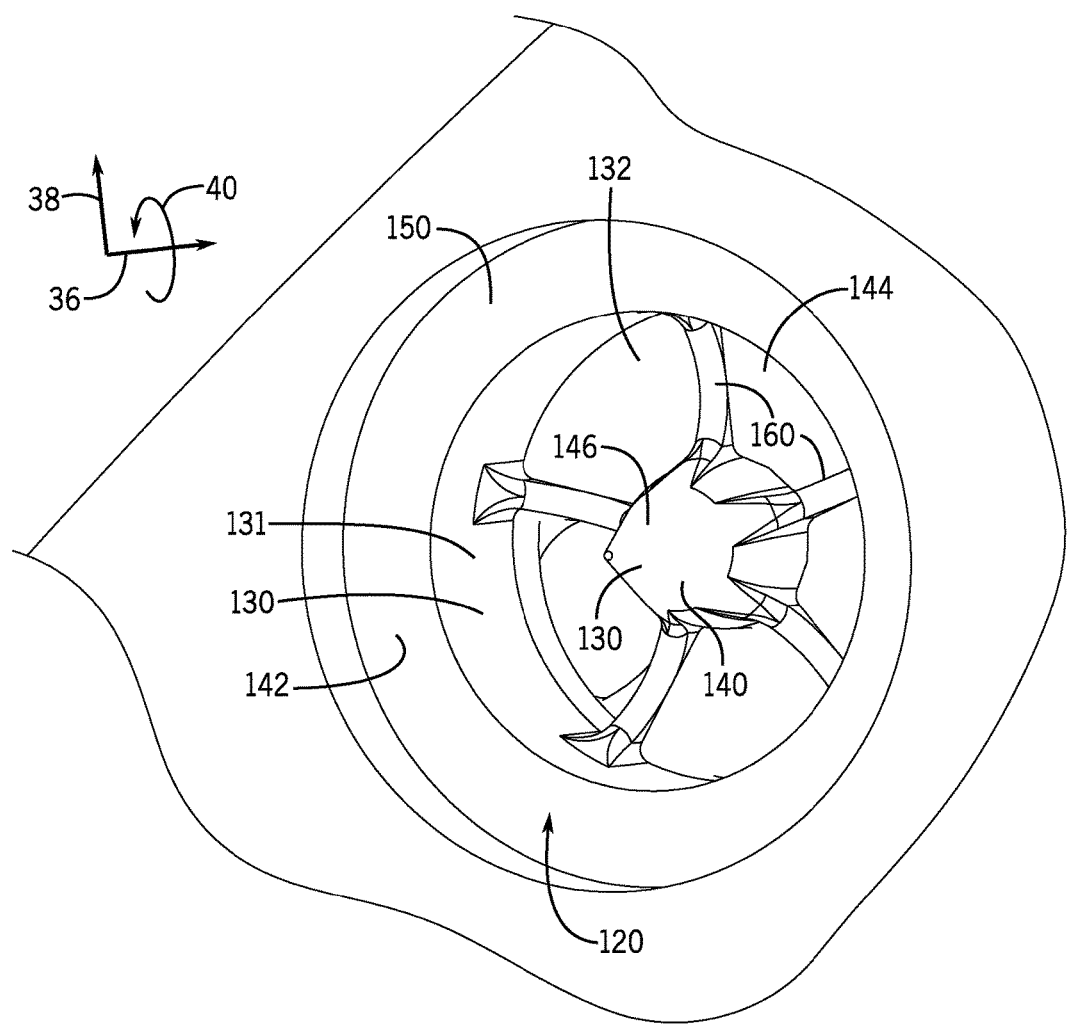
FIG. 8 is a perspective front view of the injection nozzle of FIG. 7.

FIGS. 7 and 8 are front and perspective front views, respectively, of an embodiment of the injection nozzle 120 of the sector 158 of the cap face 62 of FIG. 4, taken within line 7-7. The injection nozzle 120 is as described above. For example, as noted above, the each injection nozzle 120 includes a respective shoulder 150 to receive a respective mixing tube 18. In certain embodiments, the injection nozzle 120 may not include a shoulder 150. In addition, the injection nozzle 120 includes the single first tube portion 130 located upstream (e.g., axially upstream) of and coupled to the plurality of second tube portions 132. The single first tube portion 130 is located adjacent the first surface 122 of the cap face 62. The single tube portion 130 includes the inlet 131 to receive the flow of the air-fuel mixture from the mixing tube 18 and the second tube portions 132 each include a respective outlet 133 to discharge a respective air-fuel mixture flow into the combustor chamber 68.

Also, the injection nozzle 120 includes the central body 138 disposed between the second tube portions 132. The plurality of structures 160 (e.g., radial arms, radial supports, or radial dividers) is disposed about the central body 138 that separate the second tubes portions 132 from each other. The number of structures 160 may vary based on the number of second tube portions 132 within the injection nozzle 120. The structures 160 may radially 38 extend between the outer surface 140 of the central body 138 and inner surface 142 of the injection nozzle 120. A width 176 of each structure 160 increases in a direction (e.g., axial direction 36) from the first surface 122 to the second surface 124. Together, the central body 138 and the structures 160 define the second tube portions 132 and the plurality of passages 144 for the respective plurality of air-fuel mixture flows. The structures 160 and the central body are symmetrical with respect to each other. The central body 130 includes the conical portion 146 that increases in cross-sectional area in a direction (e.g., axial direction 36) from the first surface 122 to the second surface 124 (see FIG. 3). By partitioning the air-fuel mixture flow, the injection nozzles 120 enable heat to be pulled out (e.g., transferred away) from the cap face 62 on the second surface 124 via convective heat transfer. Specifically, the plurality of second tube portions 132 increases the surface area that interacts with the air-fuel mixture flow for convective heat transfer. This may avoid effusion cooling of the cap face 62 and any need for extra air for the cooling of the cap face 62. Although, in certain embodiments, the disclosed embodiments may be used in combination with effusion cooling.

Figure 9:
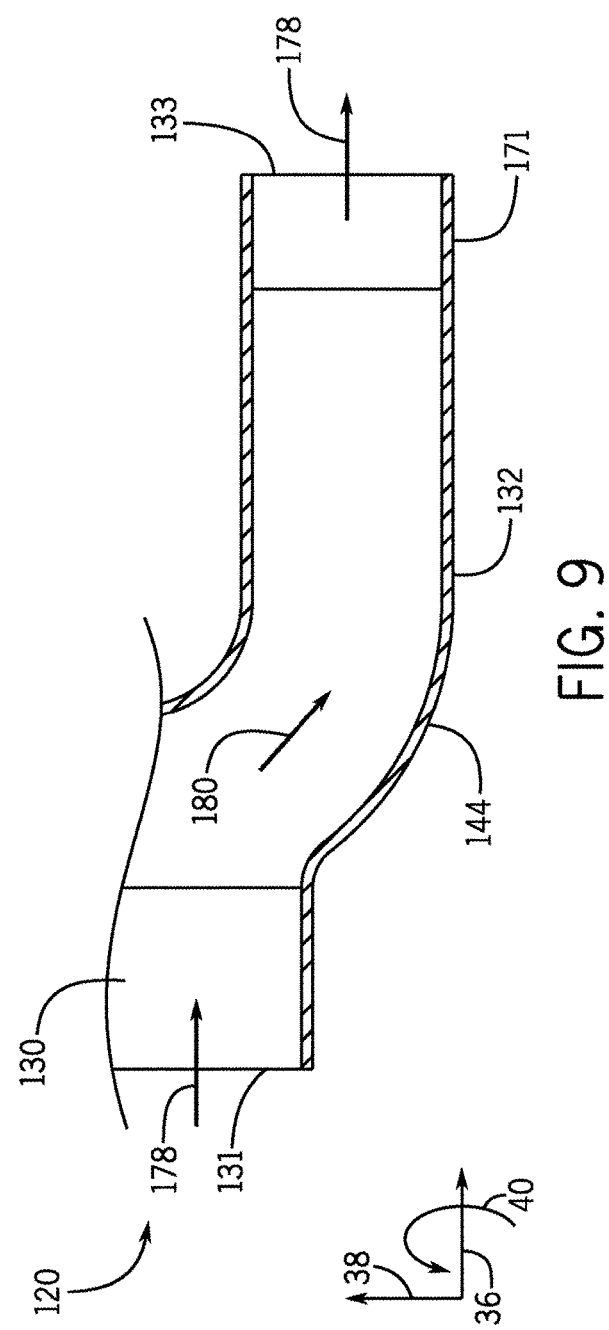
FIG. 9 is a perspective view of an embodiment of the injection nozzle of FIG. 7.

FIG. 9 is a perspective view of an embodiment of the injection nozzle 120 of FIG. 7. The injection nozzle 120 is as described above. For example, the injection nozzle 120 includes the single first tube portion 130 located upstream (e.g., axially upstream) of and coupled to the plurality of second tube portions 132 that define the plurality of passages 144 for flow of the air-fuel mixture. In certain embodiments, the number of second tube portions 132 may vary from 2 to 15. As depicted, the injection nozzle 120 includes 5 second tube portions 132. As described above, the second tube portions 132 each include the portion 171 (e.g., protruding portion) that extends beyond the second surface 124 of the cap face 62 (see FIG. 6). Each second tube portion 132 includes an upstream portion that extends (e.g., radially and axially) or diverges away from single first tube portion 130 and a downstream portion (e.g., including the portion 171) that are parallel with and radially offset from a longitudinal axis of the single first tube portion 130. The single tube portion 130 includes the inlet 131 to receive the flow of the air-fuel mixture from the mixing tube 18, and the second tube portions 132 each include a respective outlet 133 to discharge a respective air-fuel mixture flow into the combustor chamber 68. Specifically, the injection nozzle 120 is configured to receive the flow of the air-fuel mixture from the mixing tube 18 via the inlet 131 in a first direction 178 (e.g., axial direction 36). Subsequently, the injection nozzle 120 partitions (or distributes) the flow of the air-fuel mixture between the second tube portions 142 to initially direct each air-fuel mixture flow within a respective second tube portion 142 in a second direction 180 that partially diverges from the first direction 178 (e.g., in radial direction 38). Subsequent to flowing in the second direction 178, the second tube portions 142 guide the respective air-fuel mixture flows to flow in the first direction 178 again.

Technical effects of the disclosed embodiments include providing injection nozzles 120 within the cap face 62 of the cap assembly 60 that couple to respective mixing tubes 18. Each injection nozzle 120 include the single first tube portion 130 and the plurality of second tube portions 132 downstream and fluidly and physically coupled to the first tube portion 130. Each injection nozzle 120 partitions (or distributes) the air-fuel mixture flow from a respective mixing tube 18 into multiple air-fuel mixture flows to enable heat to be pulled out (e.g., transferred away) from the cap face 62 on the second surface 124 via convective heat transfer. Specifically, the plurality of second tube portions 132 increases the surface area that interacts with the air-fuel mixture flow for convective heat transfer. This may avoid effusion cooling of the cap face 62 and any need for extra air for the cooling of the cap face 62. Although, in certain embodiments, the disclosed embodiments may be used in combination with effusion cooling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a multi-tube fuel nozzle assembly, wherein the multi-tube fuel nozzle assembly comprises:
a support structure defining an interior volume configured to receive an air flow;
a plurality of mixing tubes disposed within the interior volume, wherein each mixing tube of the plurality of mixing tubes is configured to mix air and fuel to form an air-fuel mixture; and
a combustor cap coupled to the support structure, wherein the combustor cap comprises a plurality of furcating nozzles integrated within the combustor cap, each furcating nozzle of the plurality of furcating nozzles is coupled to a respective mixing tube of the plurality of mixing tubes, and wherein each furcating nozzle of the plurality of furcating nozzles is configured to receive a flow of the air-fuel mixture and to partition the flow of the air-fuel mixture into a plurality of air-fuel mixture flows.

2. The system of claim 1, wherein each furcating nozzle of the plurality of furcating nozzles comprises a single first tube portion located upstream of a plurality of second tube portions.

3. The system of claim 2, wherein the single first tube portion comprises a first diameter, each second tube portion of the plurality of second tube portions comprises a second diameter that is smaller than the first diameter.

4. The system of claim 1, wherein the combustor cap comprises a first surface facing the plurality of mixing tubes and a second surface disposed opposite the second surface, and each furcating nozzle of the plurality of furcating nozzles is coupled to the respective mixing tube of the plurality of mixing tubes at the first surface.

5. The system of claim 4, wherein each furcating nozzle of the plurality of furcating nozzles comprises a shoulder located on the first surface of the combustor cap, and wherein an end portion of each respective mixing tube of the plurality of mixing tubes is disposed within a respective shoulder of a respective furcating nozzle.

6. The system of claim 4, comprising a plurality of springs, and a retainer plate disposed within the interior volume and removably coupled to the interior volume, wherein the retainer plate is configured to at least partially support the plurality of mixing tubes, and a respective spring of the plurality of springs is disposed about a respective downstream end portion of each mixing tube of the plurality of mixing tubes between the retainer plate and the first surface of the combustor cap.

7. The system of claim 4, wherein the plurality of furcating nozzles is configured to pull out heat from the combustor cap on the second surface via convective heat transfer.

8. The system of claim 4, comprising a thermal barrier coating disposed on the second surface.

9. The system of claim 1, wherein each furcating nozzle of the plurality of furcating nozzles comprises a central body and a plurality of structures disposed about the central body that radially extend between an outer surface of the central body and an inner surface of the furcating nozzle, and the central body and the plurality of structures define a plurality of passages for the plurality of air-fuel mixture flows.

10. The system of claim 9, wherein the central body increases in cross-sectional area in a direction from the first surface to the second surface.

11. The system of claim 10, wherein the central body comprises a conical portion.

12. The system of claim 9, wherein a width of each structure of the plurality of structures increases in a direction from the first surface to the second surface.

13. The system of claim 1, wherein each furcating nozzle of the plurality of furcating nozzles is configured to receive the flow of the air-fuel mixture in a first direction, and wherein each furcating nozzle of the plurality of furcating nozzles is configured, upon receiving the flow of the air-fuel mixture and partitioning the flow of the air-fuel mixture into the plurality of air-fuel mixture flows, to initially direct each air-fuel mixture flow of the plurality of air-fuel mixture flows in a second direction that partially diverges from the first direction.

14. The system of claim 13, wherein each furcating nozzle of the plurality of furcating nozzles is configured to subsequently direct each air-fuel mixture flow of the plurality of air-fuel mixture flows in the first direction after flowing in the second direction.

15. The system of claim 1, comprising a gas turbine engine, a combustor, or a combination thereof, having the multi-tube fuel nozzle assembly.

16. A system, comprising:
a multi-tube fuel nozzle, wherein the multi-tube fuel nozzle assembly comprises:
a support structure defining an interior volume configured to receive an air flow;
a plurality of mixing tubes disposed within the interior volume, wherein each mixing tube of the plurality of mixing tubes is configured to mix air and fuel to form an air-fuel mixture; and
a combustor cap coupled to the support structure and comprising a first surface facing the plurality of mixing tubes and a second surface disposed opposite the first surface, wherein the combustor cap comprises a plurality of furcating nozzles integrated within the combustor cap, each furcating nozzle of the plurality of furcating nozzles is coupled to a respective mixing tube of the plurality of mixing tubes at the first surface, wherein each furcating nozzle of the plurality of furcating nozzles comprises a single first tube portion adjacent the first surface and a plurality of second tube portions adjacent the second surface, the single first tube portion has a first diameter, and each second tube portion of the plurality of second tube portions has a second diameter that is smaller than the first diameter.

17. The system of claim 16, wherein each second tube portion of the plurality of second tube portions comprises a first portion adjacent the single first tube portion that diverges from the first tube portion.

18. The system of claim 17, wherein each second tube portion of the plurality of second tube portions comprises a second portion coupled to the first portion that is parallel and radially offset relative to the single first tube portion.

19. The system of claim 16, wherein each furcating nozzle of the plurality of nozzles comprises a central body having a conical portion and a plurality of structures disposed about the central body that radially extend between an outer surface of the central body and an inner surface of the furcating nozzle, and the central body and the plurality of structures define the plurality of second tube portions.

20. A system, comprising:
a combustor cap configured to be coupled to a plurality of mixing tubes of a multi-tube fuel nozzle, wherein each mixing tube of the plurality of mixing tubes is configured to mix air and fuel to form an air-fuel mixture, the combustor cap comprises a plurality of furcating nozzles integrated within the combustor cap, each furcating nozzle of the plurality of furcating nozzles is configured to couple to a respective mixing tube of the plurality of mixing tubes, the combustor cap comprises a first surface that is configured to face the plurality of mixing tubes and a second surface disposed opposite the first surface, wherein each furcating nozzle of the plurality of furcating nozzles comprises a single first tube portion adjacent the first surface and a plurality of second tube portions adjacent the second surface, the single first tube portion has a first diameter, and each second tube portion of the plurality of second tube portions has a second diameter that is smaller than the first diameter.

* * * * *